United States Patent Office.

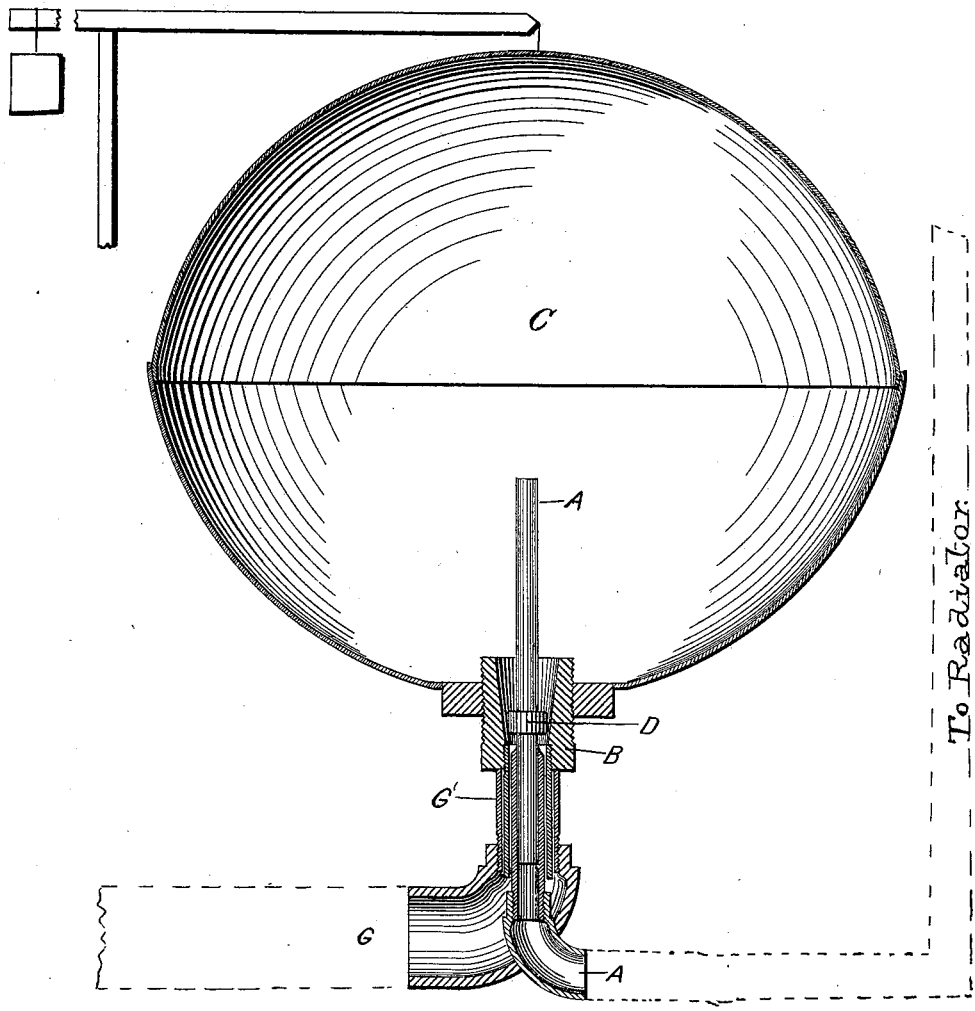

ALBERT WERTS, OF CAMDEN, NEW JERSEY, ASSIGNOR OF ONE-HALF TO WILLIAM W. ARMSTRONG, OF SAME PLACE.

STEAM-TRAP.

SPECIFICATION forming part of Letters Patent No. 613,481, dated November 1, 1898.

Application filed January 17, 1898. Serial No. 666,958. (No model.)

*To all whom it may concern:*

Be it known that I, ALBERT WERTS, a citizen of the United States of America, and a resident of Camden, Camden county, New Jersey, have invented certain new and useful Improvements in Steam-Traps, of which the following is a specification.

My invention relates to an improvement in steam-traps to be used in connection with steam-pipes after they have circulated through a building for heating purposes; and it consists in a steam-pipe and a plug through which the pipe passes, having a recess in its inner end, combined with the counterweighted chamber which is connected to the plug and which chamber and plug have a slight movement upon the steam-pipe, which is provided with a collar which serves as a valve to control the passage of water from the chamber through a suitable outlet-pipe through which the steam-pipe passes for a short distance, all of which will be more fully described hereinafter.

The object of my invention is to provide an apparatus for automatically controlling the flow of steam from the chamber through the pipes, so that when a regulated pressure of steam in the chamber is reached the flow of steam will be automatically cut off and started to flow again as soon as the steam which has been caught therein has been condensed.

The accompanying drawing represents a vertical section of a trap which embodies my invention.

A represents the steam-pipe, which is connected with the heating apparatus and which has its upper end to extend through the plug B without touching it into the upper portion of the metallic chamber C, which is screwed or otherwise secured to the plug, as shown. Upon the steam-pipe A is formed a ring or flange D, which forms a valve in connection with the plug B, which is recessed at its inner end inside of the chamber. This plug is swiveled or otherwise loosely connected to the steam-pipe A, so that the plug and the chamber C will have a rising and a falling motion upon the pipe for the purpose of shutting off the flow of steam through the chamber when the steam in the chamber has reached a regulated pressure. The inner end of the plug is recessed, as shown, and this recessed end, in connection with the flange or collar D, forms a valve for automatically cutting off the flow of steam from the chamber into the escape-pipe G whenever the pressure of the steam in the chamber C is sufficient to raise the chamber and the plug B upon the steam-pipe A, so that the bottom of the recess in the plug strikes against the collar or flange D. Whenever the pressure of the steam in the chamber becomes sufficiently great, a downward pressure upon the collar D serves to raise the chamber until the plug B strikes against its lower side.

When the pressure of steam has raised the trap and the plug, so as to cut off the flow of steam around the collar and the outside of the steam-pipe into the escape-pipe G, the trap remains in a raised position until the steam in the chamber becomes condensed, and then the trap or chamber C drops from its own gravity and the water of condensation escapes around the valve B. When the pressure of steam again reaches a certain regulated degree in the trap, the trap again rises and the flow of steam taking place in the waste-pipe is cut off.

By means of the construction here shown the flow of steam through the heating-pipes is automatically turned on and shut off without any thought or care upon the part of the operator and a circulation of the steam through the pipes is kept up.

In connection with the steam-trap any suitable counterbalance is used.

The trap is located in the engine-room, which is as a rule in the cellar. The steam passes from the boiler to the first, second, and third floors through all of the radiators until it comes to the last one on the top floor, and then the steam-pipe A runs back to the engine-room, where the trap is attached to the end of it.

Having thus described my invention, I claim—

1. In a steam-trap, a vertically-movable chamber, and a plug inserted therein having a conical opening through it, combined with a stationary steam-pipe provided with a collar or enlargement which forms a valve in connection with the plug, substantially as shown.

2. In a steam-trap for a heating apparatus, a steam-pipe provided with a collar or flange which forms a valve, combined with the chamber, and the recessed plug which is secured to the chamber, and which rises and falls upon the steam-pipe, substantially as described.

3. In a steam-trap for a heating apparatus, the steam-pipe provided with a flange, or collar, the plug recessed at its inner end, and through which the steam-pipe passes, the chamber C secured to the plug, and the waste or return pipe into which the water escapes; the flange or collar upon the steam-pipe being made to operate as a valve in connection with the bottom of the recess in the plug, which plug together with the chamber, have a rising and a falling movement upon the steam-pipe, substantially as set forth.

Signed by me at Philadelphia, Pennsylvania, this 10th day of January, 1898.

ALBERT WERTS.

Witnesses:
PARKER E. PIERCE,
WILLIAM W. ARMSTRONG.